(No Model.)
W. F. SEARGEANT.
SCRIBING ATTACHMENT.
No. 364,049. Patented May 31, 1887.
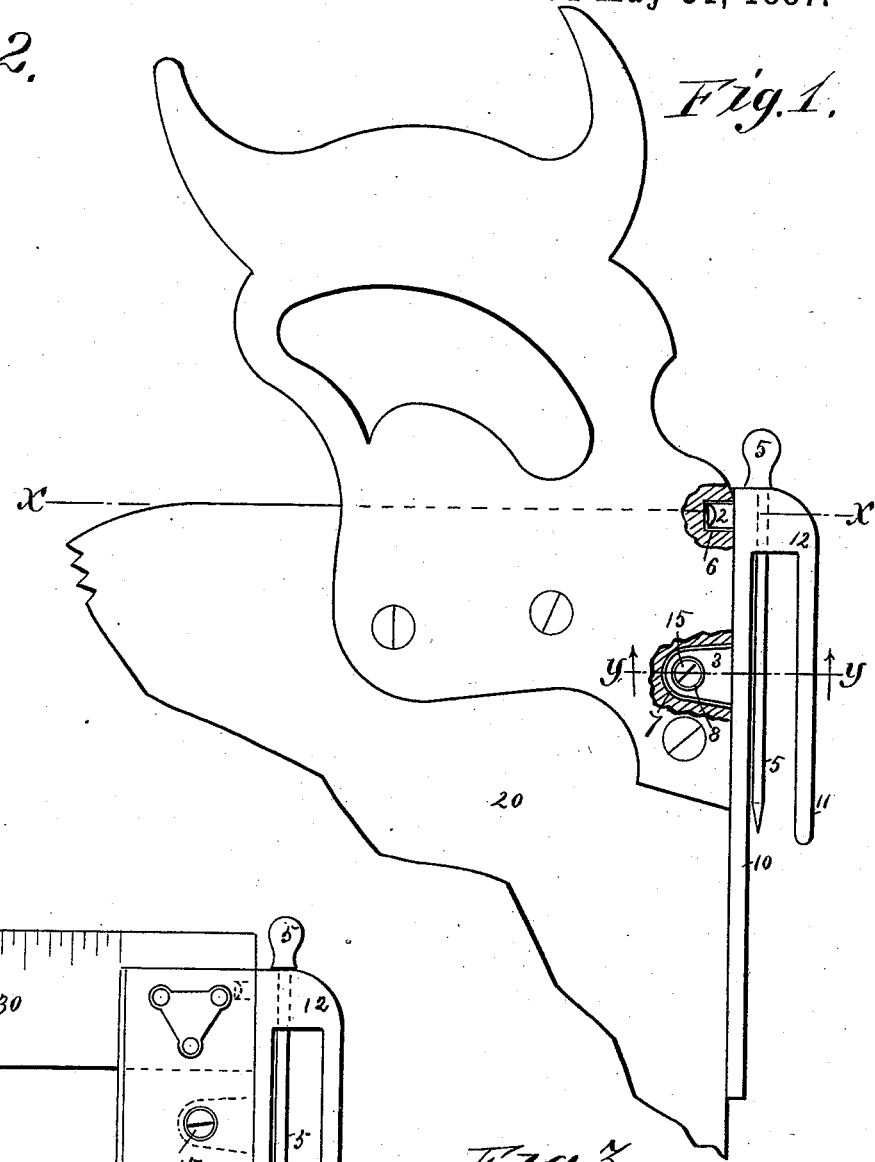
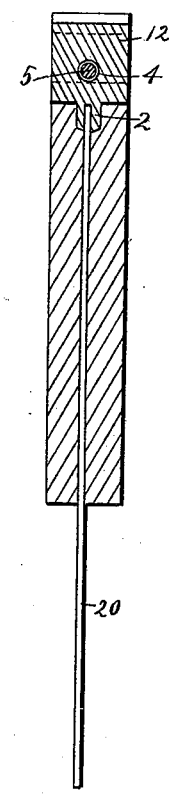
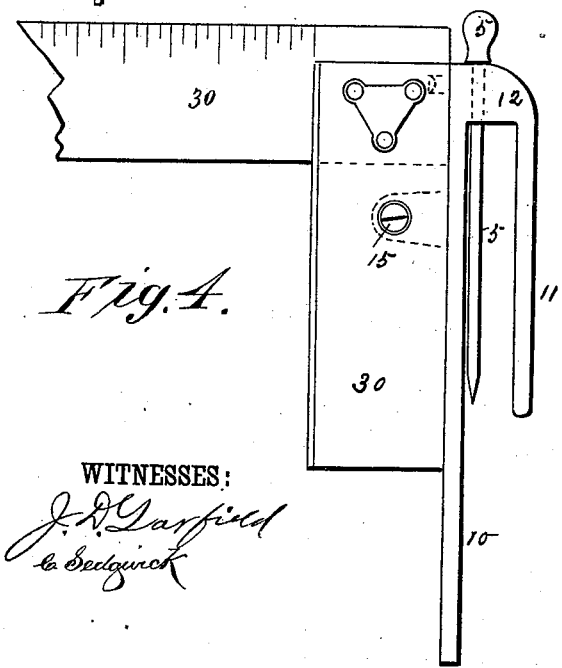
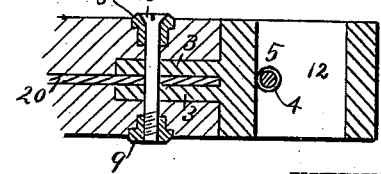
WITNESSES:
J. H. Garfield
E. Sedgwick
INVENTOR:
W. F. Seargeant
BY Munn & Co.
ATTORNEYS.

UNITED STATES PATENT OFFICE.

WILLIAM F. SEARGEANT, OF MARSHALL, MISSOURI.

SCRIBING ATTACHMENT.

SPECIFICATION forming part of Letters Patent No. 364,049, dated May 31, 1887.

Application filed May 19, 1886. Serial No. 202,652. (No model.)

*To all whom it may concern:*

Be it known that I, WILLIAM F. SEARGEANT, of Marshall, in the county of Saline and State of Missouri, have invented a new and Improved Scribing Attachment, of which the following is a full, clear, and exact description.

My present invention relates to the construction of an improved form of scribing attachment of the class forming the subject-matter of my application for Letters Patent No. 191,499, filed on the 10th day of February, 1886, the present invention consisting of certain improvements in the device employed for securing the attachment to the implement or tool in connection with which the scriber is to be employed.

In an application for Letters Patent No. 201,965, and filed on the 12th day of May, 1886, I have shown, described, and claimed a saw-handle having my scribing attachment formed integral therewith, and I therefore do not claim such in this application.

Reference is to be had to the accompanying drawings, forming a part of this specification, in which similar figures of reference indicate corresponding parts in all the figures.

Figure 1 is a side view of a portion of a saw-blade and its handle, representing my improved scribing attachment as arranged in position for use, certain portions of the handle being broken away to disclose the manner in which the attachment is secured to the saw. Fig. 2 is a sectional view taken on line *x x* of Fig. 1. Fig. 3 is a sectional view taken on line *y y* in the direction of the arrows shown, and Fig. 4 represents the attachment as applied to a try-square.

The scriber forming the subject-matter of this application consists, essentially, of two parallel legs, 10 and 11, that are united by a head-block, 12, the leg 10 being somewhat longer than the leg 11. A short lug, 2, that is centrally slotted in a line parallel with the leg 10, is formed upon the head-block 12, as best shown in Figs. 1 and 2, and some distance below the lug 2 there is a second and larger lug, 3, that is also centrally slotted, as best shown in Fig. 3. The head-block 12 is formed with an aperture, 4, in which there is fitted a scribing-point, 5.

The scriber above described is designed for use in connection with a saw, 20, as shown in Fig. 1, or with a square, 30, as shown in Fig. 4, the tool or implement in connection with which the attachment is employed being formed with properly-arranged slots, as 6 and 7, within which the lugs 2 and 3 fit, the attachment being securely held in position by means of a screw, 15, which passes through apertures formed in each section of the lug 3, and also through thimbles 8 and 9, that are inserted in the sides of the saw-handle or the stock of the square, one of the thimbles, 9, being threaded that it may be engaged by the screw, while the thimble 8 is simply countersunk to receive the head of the screw.

In the case of the construction illustrated in Fig. 1, the saw-blade enters the central slots formed in the lugs 2 and 3, and the screw 15 passes directly through an aperture formed in the saw-blade; but in the construction illustrated in Fig. 4 the blade of the square 30 enters the slot in the lug 2; but the lug 3 is arranged to enter a recess formed in the stock below the blade.

Although applicable for other uses, the attachment above described is more particularly designed for use in the marking off of weatherboards at the points where they abut against window-casings and corner-strips, the boards at this time being inserted within the space between the legs 10 and 11, the side faces of the legs being brought up against the edge of the corner-board or window-casing, after which the board is marked, so that when sawed off it will fit closely against the corner-board or window-casing, this marking of the board being accomplished by the use of the scribing-point 5, which, as before stated, is inserted within a recess formed in the head-block common to both legs of the scriber.

Having thus fully described my invention, what I claim as new, and desire to secure by Letters Patent, is—

1. An improved scribing attachment, consisting of the head-block 12, the legs 10 and 11, the slotted lug 2, projecting from the head-block, and the slotted and apertured lug 3, projecting from the leg 11, substantially as herein shown and described.

2. The combination, with a tool handle or stock provided with recesses in one edge, of a scribing attachment of the character described, having slotted lugs, one of which is apertured, and a screw passing through the said apertured lug and the stock or handle, substantially as herein shown and described.

3. The combination, with a saw or other proper tool or implement that is formed with recesses 6 and 7, and provided with thimbles 8 and 9, of a scribing attachment consisting of legs 10 and 11, united by a head-block, 12, in which there is fitted a scribing-point, 5, lugs 2 and 3, that are centrally slotted, projecting at right angles from one of the legs, and a screw, 15, arranged as described, as and for the purpose specified.

WILLIAM F. SEARGEANT.

Witnesses:
S. Y. POTTER,
CHAS. POTTER.